(12) United States Patent
Kojima et al.

(10) Patent No.: US 7,572,507 B2
(45) Date of Patent: Aug. 11, 2009

(54) OPTICAL ELEMENT AND MOISTURE-PROOF COATING METHOD THEREOF

(75) Inventors: Tatsuya Kojima, Tokyo (JP); Takuro Okubo, Tokyo (JP); Takashi Takahashi, Tokyo (JP)

(73) Assignee: Kabushiki Kaisha Topcon, Tokyo (JP)

( * ) Notice: Subject to any disclaimer, the term of this patent is extended or adjusted under 35 U.S.C. 154(b) by 185 days.

(21) Appl. No.: 11/699,583

(22) Filed: Jan. 30, 2007

(65) Prior Publication Data
US 2007/0236794 A1 Oct. 11, 2007

(30) Foreign Application Priority Data
Jan. 31, 2006 (JP) .............................. 2006-022936

(51) Int. Cl.
- B32B 3/02 (2006.01)
- B32B 17/10 (2006.01)
- B32B 17/06 (2006.01)
- B32B 17/00 (2006.01)
- B05D 1/18 (2006.01)

(52) U.S. Cl. .................. 428/421; 428/192; 428/422; 428/426; 428/430; 359/507; 359/513; 427/162; 427/163.1; 427/164; 427/165; 427/169; 427/256; 427/284

(58) Field of Classification Search .............. None
See application file for complete search history.

(56) References Cited

U.S. PATENT DOCUMENTS

| | | | | |
|---|---|---|---|---|
| 4,330,604 A * | 5/1982 | Wreede et al. | ............ | 430/2 |
| 4,786,658 A * | 11/1988 | Hashimoto et al. | ............ | 522/121 |
| 5,311,500 A * | 5/1994 | Higuchi et al. | ............ | 369/288 |
| 5,415,927 A * | 5/1995 | Hirayama et al. | ............ | 428/307.3 |
| 5,430,565 A * | 7/1995 | Yamanouchi et al. | ............ | 349/120 |
| 5,506,718 A | 4/1996 | Takahashi | | |
| 6,117,555 A * | 9/2000 | Fujimori et al. | ............ | 428/421 |
| 6,207,236 B1 * | 3/2001 | Araki et al. | ............ | 427/386 |
| 6,462,115 B1 * | 10/2002 | Takahashi et al. | ............ | 524/263 |
| 6,579,620 B2 * | 6/2003 | Mizuno et al. | ............ | 428/447 |
| 6,680,080 B1 * | 1/2004 | Belleville | ............ | 427/165 |
| 7,031,070 B2 * | 4/2006 | Suzuki et al. | ............ | 359/642 |
| 7,092,056 B2 * | 8/2006 | Shikita et al. | ............ | 349/119 |
| 7,239,451 B2 * | 7/2007 | Suzuki et al. | ............ | 359/642 |
| 7,248,414 B2 * | 7/2007 | Suzuki et al. | ............ | 359/642 |
| 7,399,524 B2 * | 7/2008 | Suzuki et al. | ............ | 428/336 |

(Continued)

FOREIGN PATENT DOCUMENTS

JP 55-138715 A 10/1980

(Continued)

Primary Examiner—Vivian Chen
(74) Attorney, Agent, or Firm—Foley & Lardner LLP

(57) ABSTRACT

An optical element includes glass substrates adhered to surfaces of a birefringent material film through an adhesive. The optical element has a coating for moisture-proof. The moisture-proof treatment is performed by applying a mixed solution of a soluble fluorine resin and an ethylenic compound to end surfaces of the glass substrates and the birefringent material film. Otherwise, the optical element is dipped in a solution prepared by mixing a soluble fluorine resin and an ethylenic compound in a predetermined mixing ratio, so as to moisture-proof the end surfaces of the glass substrates and the birefringent material film. The birefringent material film is a phase difference film. The soluble fluorine resin is an amorphous fluorine resin. The ethylenic compound is PTFE.

6 Claims, 3 Drawing Sheets

U.S. PATENT DOCUMENTS

2004/0189909 A1* 9/2004 Kashima .................. 349/117

FOREIGN PATENT DOCUMENTS

| JP | 6-043375 A | | 2/1994 |
| JP | 08-146219 | * | 6/1996 |
| JP | 8-146219 A | | 6/1996 |
| JP | 2000-155372 A | | 6/2000 |
| WO | WO 2005-083474 | * | 9/2005 |

* cited by examiner (A)

(B)

Deterioration with time

OPTICAL ELEMENT AND MOISTURE-PROOF COATING METHOD THEREOF

TECHNICAL FIELD

The present invention relates to an optical element for use in a rear projector, a front projector, a CD, a DVD, an HDD, a Blue-Ray player, an exposure equipment for semiconductor manufacture or liquid crystal substrate, an immersion lithographic apparatus or the like, and a moisture-proof coating method of the optical element and, particularly, relates to an optical element such as a wavelength plate, a polarizing plate, a beam splitter, a laminate lens or the like, and a method for applying a moisture-proof coating thereto.

RELATED ART

Conventionally, an optical element such as a wavelength plate for use in a projector or the like is manufactured in a sandwich form by adhering glass substrates through an adhesive to both sides of a birefringent material film such as a phase different film produced by drawing (refer to, for example, Japanese Patent Unexamined Publication No. 2000-155372).

On the other hand, techniques for moisture-proofing the whole surface of a lens, a prism or the like (refer to, for example, Japanese Patent Unexamined Publication No. 6-43375); for entirely coating the cut surface of a reflecting-polarizing plate with a resin such as polyester resin, acrylic resin or epoxy resin (refer to, for example, FIG. 1 of Japanese Patent Unexamined Publication No. 8-146219); for coating the peripheral end part of a polarizing plate arranged on a surface of a liquid crystal cell with a moisture-proof adhesive (refer to, for example, Japanese Patent Unexamined Publication No. 55-138715), and the like are also known.

However, when such a conventional optical element is subjected to a high-temperature, high-humidity environmental durability test, the whole circumference 22 of end surface of glass substrates 21 adhered to both sides of a phase difference film may be deteriorated with the lapse of time and peeled, as shown in FIG. 5.

SUMMARY OF THE INVENTION

An object of the present invention is to provide an optical element and a moisture-proof coating method thereof, which can prevent the deterioration with time in a high-temperature, high-humidity environment to prevent the peeling of glass substrate from phase difference film.

In a first aspect of the invention, a moisture-proof coating method of an optical element includes use of glass substrates adhered to surfaces of a birefringent material film through an adhesive. The method includes moisture-proofing the optical element by applying a mixed solution of a soluble fluorine resin and an ethylenic compound to the end surfaces of the glass substrates and the birefringent material film to form a coating on the end surface of the adhesive present among the glass substrates and the birefringent material film.

In a second aspect of the invention, a moisture-proof coating method of an optical element includes use of glass substrates adhered to surfaces of a birefringent material film through an adhesive. The method includes moisture-proofing the optical element by dipping the optical element having the adhesive interposed among the glass substrates and the birefringent material film in a solution prepared by mixing a soluble fluorine resin and an ethylenic compound in a predetermined mixing ratio to form a coating on the end surface of the adhesive present among the glass substrates and the birefringent material film.

According to a third aspect of the present invention, in the moisture-proof coating method of an optical element according to the first or second aspect, the birefringent material film is a phase difference film, the soluble fluorine resin is an amorphous fluorine resin, and the ethylenic compound is PTFE.

A fourth aspect of the present invention is an optical element including a birefringent material film and glass substrates which are adhered through an adhesive. The end surfaces of the birefringent material film and the glass substrates are moisture-proofed by a coating formed from a solution prepared by mixing a soluble fluorine resin and an ethylenic compound in a predetermined mixing ratio.

A fifth aspect of the present invention is the optical element according to the fourth aspect, in which the birefringent material film is a phase difference film, the soluble fluorine resin is an amorphous fluorine resin, and the ethylenic compound is PTFE.

As a result of the earnest studies, the present inventors have developed an optical element capable of preventing the deterioration with time of adhesive to prevent the peeling of glass substrates from phase difference film by moisture-proofing, for example, an optical element which is obtained by adhering two glass substrates to a phase difference film while applying an adhesive to both sides of the phase difference film so as to nip the phase difference film between the both, by sticking adhesive sheets to the outer surfaces of the glass substrates, and by dipping the thus treated glass substrates, for preventing a chemical influence on the adhesive used for the adhesion in a high-temperature, high-humidity environment, in a mixed solution of a soluble fluorine resin and an ethylenic compound adjusted in concentration or mixing ratio to form a coating on the end surface of the adhesive present among the phase difference film and the glass substrates while coating the whole circumference of the end surfaces (edge surfaces) of the phase difference film and the glass substrates.

According to the present invention, since the method of performing the moisture-proof coating to the adhesive by dipping the optical element in a characteristic solution is adapted, the adhesive is not so much deteriorated with the lapse of time in a high-temperature, high-humidity environment and, consequently, a wavelength plate never causing the peeling of glass substrate from phase difference film can be manufactured.

EMBODIMENTS

Preferred embodiments of the present invention will be described in reference to the drawings.

A preferred example of the optical element according to the present invention is a wavelength plate, for example, for use in a projector or the like.

Figure 1:
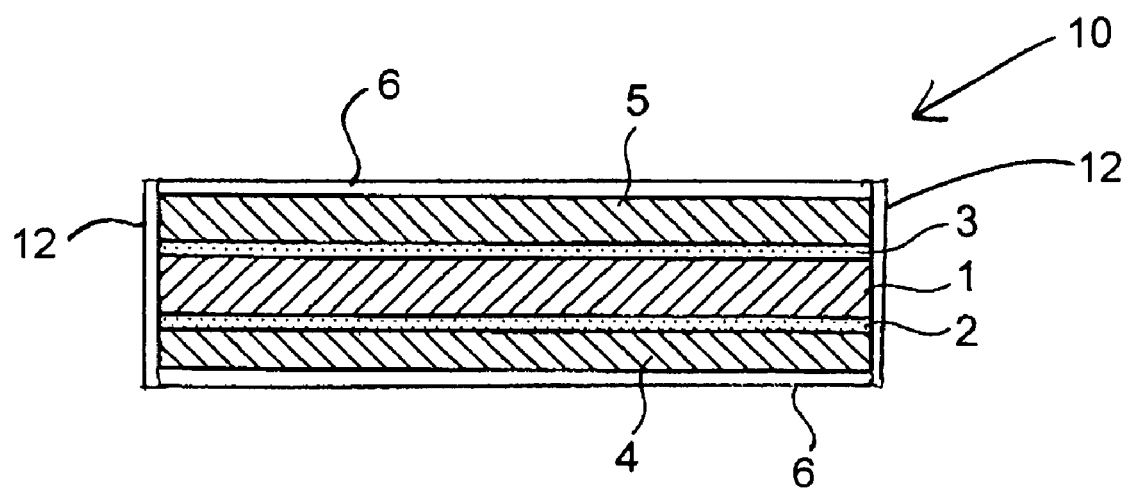
FIG. 1 is a vertical sectional view showing a wavelength plate according to one embodiment of the present invention.

FIG. 1 shows a wavelength plate in which adhesives 2, 3 are applied to both sides of a phase difference film 1, and two glass substrates 4, 5 are adhered through the adhesives 2, 3 so as to nip the phase difference film 1 from both the sides thereof.

In the example of FIG. 1, preferably, the phase difference film 1 is 0.2 to 1.0 mm thick, the adhesives 2, 3 are 5 to 20 μm thick, and the glass substrates 4, 5 are 0.2 to 2.0 mm thick.

As shown in FIG. 1, the adhesives 2, 3 are applied to both sides of the phase difference film 1 consisting of a birefringent material film, and the glass substrates 4, 5 are adhered thereto in a sandwich form.

The adhesive consists of, for example, a resin such as polycarbonate. When the linear expansion coefficient of the adhesive is L1, the linear expansion coefficient L2 of the phase difference film is L2, and the linear expansion coefficient of the glass substrate is L3, for example, the relation of L3<L1<L2 is satisfied at an ordinary temperature of about 40° C., and the relation of L3<L2<L1 is satisfied at a temperature higher than the glass transition temperature of the adhesive. In this case, the glass transition temperature of the adhesive is, for example, about 40° C.

Adhesive sheets 6 are stuck to the outer surfaces of the glass substrates 4, 5 of the adhered wavelength plate (the upper outer surface and the lower outer surface in FIG. 1), whereby a wavelength plate 10 is formed. The adhesive sheets 6 may be removed as occasion demands after forming a coating 12.

Figure 2:
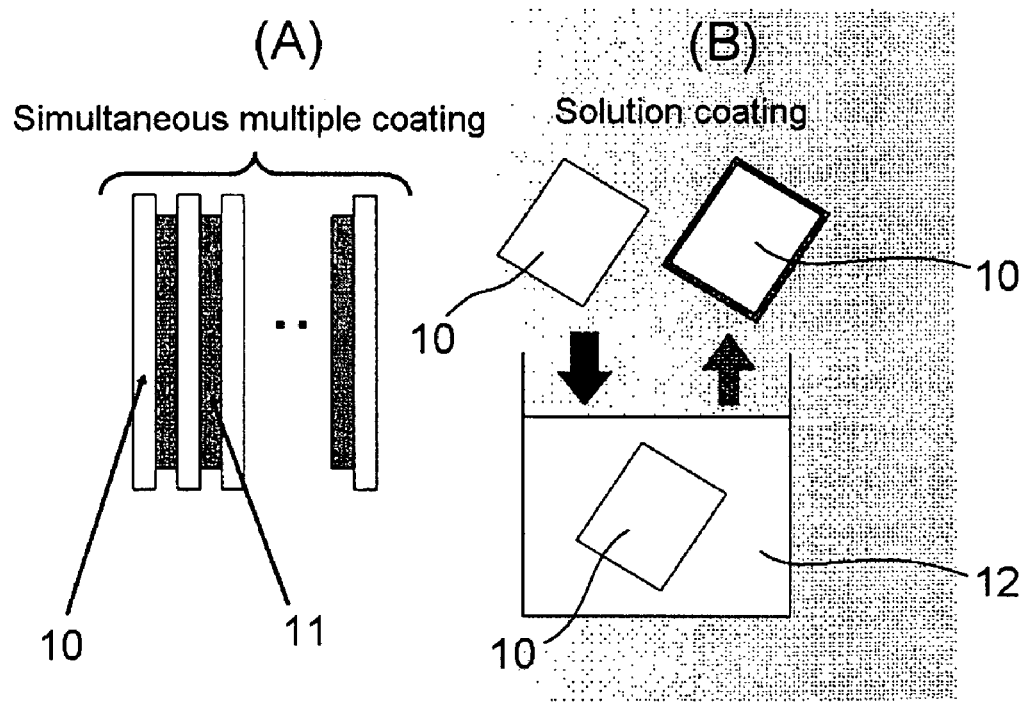
FIGS. 2(A) and (B) are schematic illustrative views describing a method for simultaneously coating a number of wavelength plates according to one preferred embodiment of the method of the present invention.

As shown in FIG. 2(A), two or more wavelength plates 10 are arranged in parallel while interposing a cushioning material 11 such as rubber each between the wavelength plates 10 to form one set, and this set is dipped in the moisture-proof coating material solution 12 of soluble fluorine resin as shown in FIG. 2(B). The moisture-proofing treatment is performed while controlling the concentration of the solution 12 or the lifting rate of the wavelength plate 10 as described below.

The adhesive of the adhesive sheets 6 consists of, for example, an epoxy resin, an acrylic resin or the like, which is not compatible with the solution of soluble fluorine resin.

In the environmental test described below, the test is performed for moisture-proofed wavelength plates by moisture-proof coating of two wavelength plates 10 with the cushioning material 11 interposed between them and for those by moisture-proof coating of three wavelength plates 10 with the cushioning materials 11 interposed each among them. However, the number of wavelength plates is not limited thereby and can be more than three in the present invention.

Figure 3:
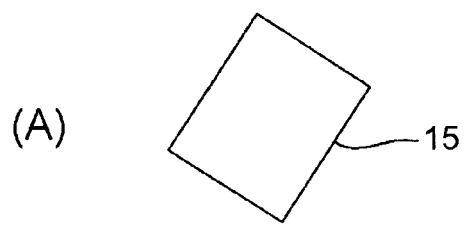
FIGS. 3(A) and (B) are illustrative views showing one example of a process for manufacturing a number of wavelength plates from a large glass substrate.
Figure 3:
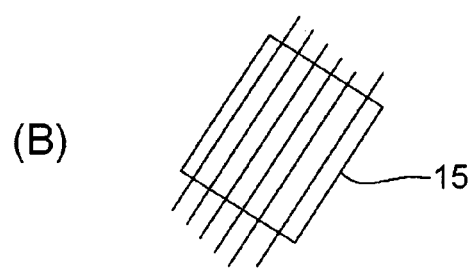

As the coating method, besides the above, a wavelength plate 15 formed by adhering large glass substrates, for example, 30-cm square glass substrates to a phase difference film through an adhesive in a sandwich form, as shown in FIG. 3(A), can be dipped in a solution of the moisture-proof coating material (soluble fluorine resin). In this case, the whole peripheral part of the 30-cm square wavelength plate 15 is moisture-proofed. Thereafter, as shown in FIG. 3(B), the wavelength plate is cut vertically in a predetermined rectangular size by a cutting machine not shown. These cut surfaces are dipped in the solution of the moisture-proof coating material (soluble fluorine resin) again. Each piece was further cut laterally in a predetermined size by the cutting machine, and then dipped in the solution of the moisture-proof coating material (soluble fluorine resin). According to this, a rectangular wavelength plate entirely moisture-proofed in the whole circumference of the peripheral part can be mass produced.

Examples of a sealant to be used for the moisture-proof coating treatment include a soluble amorphous fluorine resin (soluble fluorine resin) such as CYTOP (trademark) series manufactured by Asahi glass such as CYTOP CTX-109A, TEFLON (trademark) AF manufactured by DuPont, ALGOFLON by Solvay-Crisis, or RD-80 manufactured by Ryoko Chemical.

An ethylenic compound powder such as polytetrafluoroethylene (PTFE) is added to the soluble fluorine resin as an additive, for example. In addition to PTFE, a fluorine resin such as PFA (tetrafluoroethylene-perfluoroalkyl vinyl ether copolymer), FEP (tetrafluoroethylene-hexafluoropropylene copolymer), ETFE (tetrafluoroethylene-ethylene copolymer), PVDF (polyvinylidene fluoride), or PCTFE (polychlorotrifluoroethylene) may be used.

The moisture-proof coating layer or the coating 12 is preferably not more than 20 μm thick.

Figure 4:
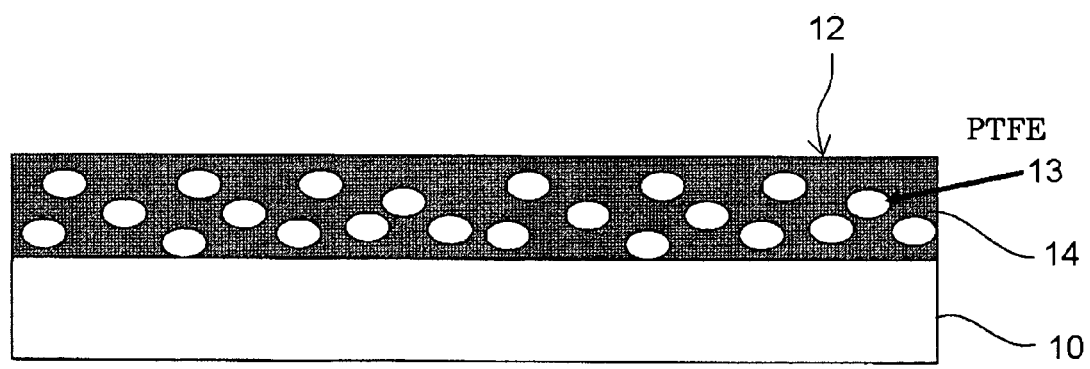
FIG. 4 is an enlarged vertical sectional view showing an end surface of a wavelength plate according to one preferred embodiment of the present invention.
Figure 5:
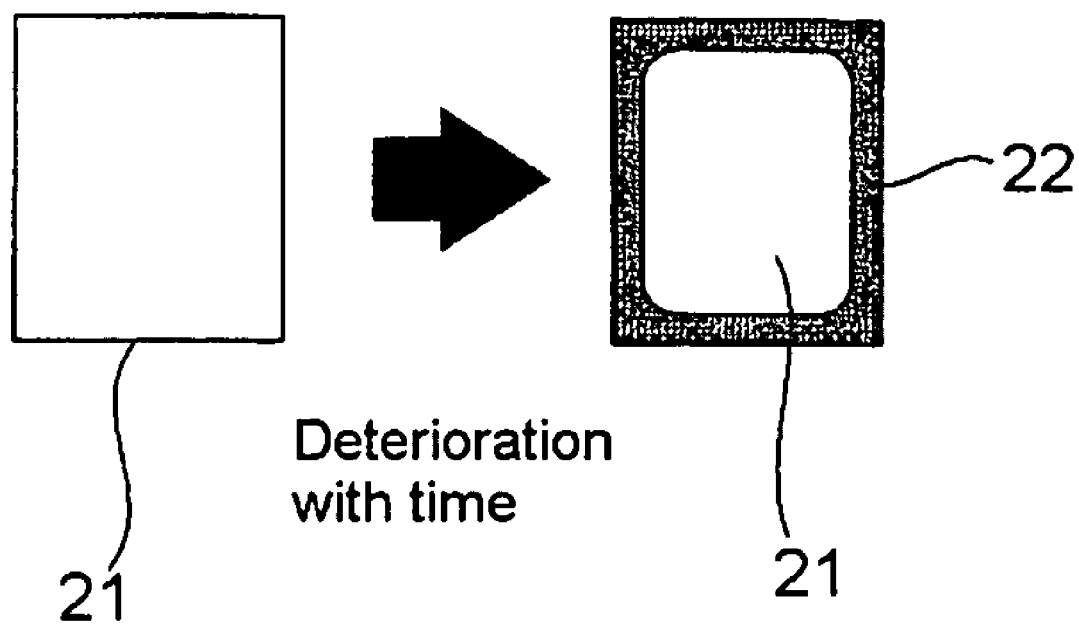
FIG. 5 is an illustrative view showing the deterioration with time of a conventional wavelength plate.

In close-up of a section of the end surface of the wavelength plate 10 of FIG. 1 after forming the coating 21 thereon followed by drying, as shown in FIG. 4, the coating 12 includes PTFE 13 distributed as particles in a sealant 14 as it is, and this prevents easy access of water molecules.

The sealant 14 is applied, when its adhesiveness is poor, in combination with a primer such as amino silane-based compound.

The mixing ratio (wt % ratio) of the soluble fluorine resin to the ethylenic compound is preferably set to 10:0.1 to 10:10.

A preferable coating method will be described. A solution coater is used with a lifting rate set to 1.67 to 3.33 mm/sec. The drying is performed by leaving in an atmosphere of 60° C. for 1 hour. The lifting rate is not limited by the above, and the range between 0.1 mm/sec and 2.0 mm/sec is valid.

At the time of lifting, the wavelength plate is held within a plane vertical to the solution level while opposing the peripheral surface to the solution level, and lifted while inclining one side of the wavelength plate at 30 to 45° within a plane vertical to the solution level. The inclination angle is not limited thereby, and any inclination angle can be adapted.

After forming the coating 12, a high-temperature, high-humidity environmental durability test was performed.

As the condition, the wavelength plate is disposed in an environment having a temperature of 60° C. and a humidity of 90% for 500 hours.

After 140 hours from the start of test, moisture resisting performance evaluation was performed. The result is shown in Table 1. The same result could be obtained in subsequent tests.

TABLE 1

| Sample | Mixed Solution A | Mixed Solution B |
|---|---|---|
| 1 | ◎ | ○-Δ |
| 2 | ◎ | ○-Δ |
| 3 | ◎ | ○-Δ |
| Cushioning Material 1*[1] | ○ | ○ |
| Cushioning Material 2*[1] | ○ | ○-Δ |
| Multiple Coating 1-1*[2] | ○ | X |
| Multiple Coating 1-2*[2] | Δ | Δ |
| Multiple Coating 2-1*[3] |  | Δ |

TABLE 1-continued

| Sample | Mixed Solution A | Mixed Solution B |
|---|---|---|
| Multiple Coating 2-2*[3] | | ○ |
| Multiple Coating 2-3*[3] | | Δ |

In Table 1,
*[1]shows coating using a cushioning material,
*[2]shows simultaneous coating of two pieces, and
*[3]shows simultaneous coating of three pieces.

The mixed solution A contains 5 wt % of fluorine resin PTFE to 10 wt % of soluble fluorine resin CYTOP (trademark) CTX-109A, while the mixed solution B contains 7 wt % of fluorine resin PTFE to 10 wt % of soluble fluorine resin CYTOP (trademark) CTX-109A.

The same test was performed by mixing, besides the above-mentioned soluble fluorine resin, resins such as TEFLON (trademark) AF, ALGOFLON, and RD-80 with fluorine resins such as PTFE. In these cases, also, no deterioration or peeling from the wavelength plate peripheral part was observed.

Further, in tests for moisture-proof property and adhesiveness, no deterioration or peeling was observed.

Although the above example describes a moisture-proof coating method using a wavelength plate for projector, the deterioration or peeling in a high-temperature, high-humidity environment can be prevented even in optical elements such as a wavelength plate, a polarizing plate, a beam splitter and a laminate lens which are used in a CD, a DVD, an HDD, a Blue-Ray player, an exposure equipment for semiconductor manufacture or liquid crystal substrate, an immersion lithographic apparatus and the like, without being limited thereby, by performing moisture-proof treatment thereto in the same manner.

This application claims priority from Japanese Patent Application 2006-022936, filed Jan. 31, 2006, which is incorporated herein by reference in its entirety.

The invention claimed is:

1. An optical element, comprising a birefringent material film and glass substrates adhered to the surfaces of the birefringent material film through an adhesive, wherein end surfaces of the birefringent material film and the glass substrates are moisture-proofed by a coating formed from a solution prepared by mixing a soluble fluorine resin and an ethylenic compound.

2. The optical element according to claim 1, wherein the birefringent material film comprises a phase difference film, the soluble fluorine resin comprises an amorphous fluorine resin, and the ethylenic compound comprises PTFE.

3. A method for moisture-proof coating an optical element, the method comprising:
applying a mixed solution of a soluble fluorine resin and an ethylenic compound to end surfaces of the optical element, so that the optical element is moisture-proofed;
wherein:
the optical element comprises glass substrates adhered to surfaces of a birefringent material film through an adhesive, and the mixed solution is applied to the optical element so as to form a coating on an end surface of the adhesive present among the glass substrates and the birefringent material film; and
the birefringent material film comprises a phase difference film, the soluble fluorine resin comprises an amorphous fluorine resin, and the ethylenic compound comprises PTFE.

4. The method of claim 3, wherein the mixing ratio of the amorphous fluorine resin to the PTFE in the mixed solution is 10:0.1 to 10:10.

5. A method for moisture-proof coating an optical element, the method comprising:
mixing a soluble fluorine resin and an ethylenic compound to prepare a solution, and
dipping the optical element in the solution so that the optical element is moisture-proofed;
wherein:
the optical element comprises glass substrates adhered to surfaces of a birefringent material film through an adhesive, and the adhesive is interposed among the glass substrates and the birefringent material film;
the optical element is dipped in the solution so as to form a coating on the end surface of the adhesive present among the glass substrates and the birefringent material film; and
the birefringent material film lush comprises a phase difference film, the soluble fluorine resin comprises an amorphous fluorine resin, and the ethylenic compound comprises PTFE.

6. The method of claim 5, wherein the mixing ratio of the amorphous fluorine resin to the PTFE in the solution is 10:0.1 to 10:10.

* * * * *